UNITED STATES PATENT OFFICE 2,481,156

REACTION PRODUCTS OF A POLYHYDRIC ALCOHOL AND A TRIAZINE DERIVATIVE AND METHODS OF PREPARING THE SAME

Frederic C. Schaefer, Stamford, Conn., assignor to American Cyanamid Company, New York, N. Y., a corporation of Maine No Drawing. Application December 20, 1946, Serial No. 717,606

17 Claims. (Cl. 260—2)

This invention relates to new synthetic materials having particular utility in the plastics and coating arts and to methods of preparing the same. More particularly the invention is concerned with compositions comprising a synthetic material, more specifically a resinous material or composition, which is obtained by effecting reaction between ingredients including (1) a triazine derivative represented by the general formula

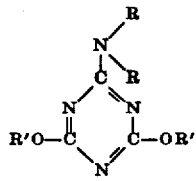

where R represents a number of the class consisting of hydrogen and monovalent hydrocarbon radicals and R' represents a monovalent hydro-(carbon radical (e. g., 2-amino-4,6-dimethoxy-1,3,5-triazine, 2-amino-4,6-dialloxy-1,3,5-triazine, 2-cyclohexylamino-4,6-dimethoxy - 1,3,5-triazine, etc.) and (2) a polyhydric alcohol in which the hydroxy groups are members of the class consisting of primary and secondary hydroxy groups (e. g., glycerol, ethylene glycol, diethylene glycol, propylene glycol, dipropylene glycol, etc.), the hydroxy groups being the only reactive functional groups which are present in the said polyhydric alcohol. In certain cases it is desirable to use triazine derivatives wherein R represents hydrogen, that is, compounds represented by the general formula

II

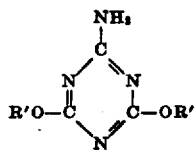

where R' represents a monovalent hydrocarbon radical.

Illustrative examples of monovalent hydrocarbon radicals which R (Formula I) and R' (Formulas I and II) may represent are: aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, tolylethyl, phenylpropyl, etc.).

It is an object of the present invention to prepare a new class of synthetic materials, more particularly resinous compositions, which have particular utility in the plastics and coating arts as such, or as components of plastics and coating compositions, or as intermediates in the preparation of other resinous materials which are especially suitable for use in such fields.

Another object of the present invention is to prepare a new class of linear polymeric materials of the thermoplastic type, but which can be rendered thermosetting or potentially thermosetting by reaction with an aldehyde, specifically formaldehyde.

A further object of the invention is to provide an economical and efficient method by which the new synthetic materials described in the first paragraph of this specification may be prepared.

Other objects of the invention will be apparent to those skilled in the art as the description of the invention proceeds.

It was known prior to my invention that a triazinyl ester different from those embraced by Formula I, specifically trimethyl cyanurate, could be transesterified with a monohydric alcohol. Thus, Hofmann [Ber. 19, 2061-2083 (1886)] observed that if trimethyl cyanurate is refluxed with an equivalent amount of sodium ethoxide in ethanol, it is completely transformed to the triethyl ester. However, to the best of my knowledge and belief, the reaction, more particularly a transesterification reaction, between a polyhydric alcohol and a triazine derivative of the kind embraced by Formula I to yield resinous materials, specifically linear polymeric resinous materials, varying in properties from liquids to hard, brittle resins was not known prior to my invention.

In practicing my invention reaction is effected between ingredients including a triazine derivative of the kind embraced by Formula I and a polyhydric alcohol, preferably a dihydric alcohol, in which the hydroxy groups are either all primary or all secondary or some primary and some secondary. The reaction is essentially a transesterification reaction, especially if conducted under heat at a temperature not exceeding about 155° C. In a transesterification reaction between a triazine derivative such as is covered by Formula I and a polyhydric alcohol several side reactions can occur, especially at temperatures at and above about 165° C. These are: (1) molecular rearrangement of the triazine derivative to an inactive form; (2) autoalkylation of the triazine derivative with resultant formation of hydroxy-1,3,5-triazines which destroy or tend to destroy any alkali metal or alkali-metal alcoholate used as a catalyst for the reaction; and (3) replacement of the amino group attached to the triazine nucleus by the polyhydric alcohol, thus giving rise to three-dimensional polymers. None of these side reactions requires a catalyst. However, all of these reactions are slow with most of the triazine derivatives embraced by Formula I and all can be effectively avoided by carrying out the transesterification reaction at a temperature not exceeding about 155° C., and preferably below 150° C. during all or most of the reaction period. In practicing my invention to obtain linear polymeric materials, I therefore prefer to conduct the reaction between the triazine derivatives and the polyhydric alcohol fairly rapidly at a relatively low temperature, thereby either obviating such side reactions substantially completely or reducing them to a minimum.

As indicated above, a reaction between the triazine derivative and the polyhydric alcohol will proceed under heat in the absence of a catalyst. However, in the preparation of linear, polymeric, resinous materials a catalyst for the reaction ordinarily is employed, the kind and amount of catalyst being so chosen that the reaction will proceed in the desired direction with a minimum formation of undesired by-products. As catalysts for the transesterification reaction, I prefer to use a member of the class consisting of alkali metals, more particularly sodium, potassium, lithium, rubidium or caesium (or mixtures thereof), and alcoholates of alkali metals (or mixtures thereof). The catalyst may be employed in the form of a mixture of an alkali metal and an alcoholate of such a metal. If the catalyst is not initially in the form of an alkali-metal alkoxide or alcoholate, the latter is formed when the alkali metal is dissolved in the polyhydric alcohol reactant.

The amount of catalyst may be varied over a wide range depending, for example, upon the particular triazine derivative and polyhydric alcohol employed and the particular properties desired in the finished product. Ordinarily, however, the catalyst is used in an amount, calculated as alkali metal, e. g., sodium, corresponding to at least about 1.5 mol per cent, preferably from 2 to 10 or 12 mol per cent, of the molar amount of the triazine derivative employed. The use of higher percentages of catalyst is not precluded, but no particular advantage accrues therefrom. Optimum results have been obtained when the amount of catalyst, calculated as alkali metal, was from about 4 to 8 mol per cent of the molar amount of the triazine derivative used. The amount of catalyst required to give optimum reaction conditions with different triazine derivatives appears to increase in the order of increasing acidity of the amino group attached to the triazine nucleus.

The proportions of the triazine derivative and the polyhydric alcohol may be considerably varied, e. g., from approximately equimolecular proportions of each reactant to from 2 or 3 mols of the polyhydric alcohol, e. g., a glycol, per mol of the triazine derivative. I prefer to use the polyhydric alcohol and triazine derivative in approximately stoichiometrical proportions. Thus, when the polyhydric alcohol is a dihydric alcohol, the reactants preferably are employed in approximately equal molar proportions.

The reaction may be effected in the presence or absence of an inert solvent, that is, a solvent which is inert during the reaction, e. g., benzene, toluene, xylene, dioxane, anisole, etc. If an inert solvent or a substantial molecular excess of polyhydric alcohol is employed, the reaction may be carried out at atmospheric pressure. If an inert solvent or a substantial molecular excess of polyhydric alcohol is not employed, then the reaction advantageously is conducted in large part under reduced pressure, e. g., from 750 mm. down to 0.5 mm. pressure, the lower pressures being employed at least toward the end of the reaction period. The pressure may be adjusted as desired or as conditions may require in order to effect the reaction without substantial decomposition of the reactants and to remove, e. g., by distillation, the volatile matter, more particularly the by-product alcohol, from the reaction vessel as transesterification between the reactants proceeds.

The general reaction involved in the preparation of linear polymers from triazine derivatives of the kind embraced by Formula I and polyhydric alcohols may be illustrated by the following equation in which a dihydric alcohol is shown as the alcohol employed:

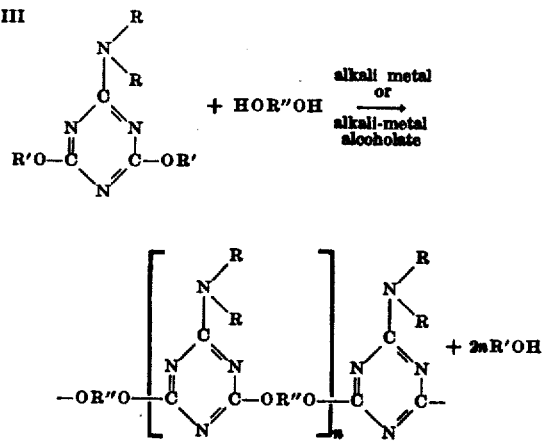

In the above equation R and R' have the same meanings as given above with reference to Formula I and R'' represents the hydrocarbon chain of a dihydric alcohol. Surprisingly, such a reaction does not occur when R' in the formula for the starting triazine derivative represents hydrogen.

In most cases the reaction starts at about 70° or 80° C. and usually about 50% of the by-product alcohol, which is indicative of the extent of the reaction, is removed at a temperature around 100° to 130° C. Generally, the reaction is slower and less complete when high temperatures (e. g., around 180° C.) are used from the start. If a reaction product which is essentially linear in structure be desired, it may be obtained by heating the reaction mass, preferably under reduced pressure, at a final temperature of approximately 140° to 155° C., preferably at about 140° to 150° C., until no more alcohol is evolved. The total time of reaction will vary considerably depending, for example, upon the size of the batch, the particular reactants employed and other influencing factors. Ordinarily, however, the transesterification reaction to obtain linear polymers is completed by heating the mixed reactants in the presence of the catalyst under reduced pressure at from about 70° to 155° C. for about ½ to about 5 or 6 hours.

The linear polymers produced by my invention vary from liquid compositions to resinous materials which are solid or semi-solid at room temperature. In general, the products are softer as glycols of higher molecular weight are used. Decamethylene glycol appears to react more sluggishly than triethylene glycol or diethylene glycol. This is in accord with the somewhat greater reactivity of the hydroxyl groups in the polyethylene glycols as shown in other reactions, as for example the reactivity toward sodium. Surprisingly 2-ethyl-1,3-hexanediol reacts more rapidly than other glycols tested, despite the fact that one hydroxyl group is secondary. The melting point also may be lowered by employing triazine derivatives wherein the amino group attached to the triazine nucleus is substituted with a monovalent hydrocarbon radical. Greater substitution of the amino group also increases the solubility of the resin in organic solvents, e. g., solvent naphthas, benzene, toluene, xylene, butanol, amyl acetate, methyl ethyl ketone, ethylene glycol monoethyl ether, ethylene glycol, etc.

If a more complex resinuous material, that is, one containing a lesser amount (if any) of linear polymers, be desired, it may be obtained by heating the reaction mass substantially above 155° C., e. g., from about 165° to 200° or 210° C. or more, for a prolonged period under reduced pressure or at a lower temperature at atmospheric pressure. This high temperature reaction may be effected in the presence or absence of solvents as described above with reference to the production of linear polymers. The reaction as temperatures above about 165° C. produces or tends to produce three-dimensional polymers, that is, resinous materials which are thermosetting or potentially thermosetting. It is possible that this is due to a reaction between the amino group of the triazine nucleus and the polyhydric alcohol at the higher temperatures.

In some cases it may be desirable to use a mixture of triazine derivatives of the kind embraced by Formula I instead of a single triazine derivative. In this way, and as is shown by some of the examples which follow, the reactivity of a sluggish triazine derivative with a particular polyhydric alcohol is enhanced by the presence of a second, more reactive triazine derivative. The properties of the final product also may be varied by using a plurality of dihydric or other polyhydric alcohols with a single triazine derivative or with a plurality of triazine derivatives.

In order that those skilled in the art better may understand how the present invention may be carried into effect, the following examples are given by way of illustration and not by way of limitation. All parts are by weight.

EXAMPLE 1

|  | Parts | Approx. Mol Ratio |
|---|---|---|
| 2-Amino-4,6-dialloxy-1,3,5-triazine | 416 | 2 |
| Triethylene glycol | 150 | 1 |
| Sodium | 15 | |

In a reaction vessel provided with a stirrer, a thermometer and a fractionating column were placed the above-stated amounts of triethylene glycol and metallic sodium. The glycol was warmed slightly until the sodium had dissolved, that is, had reacted with the glycol to yield a sodium alcoholate in solution in the unreacted glycol. The above-stated amount of 2-amino-4,6-dialloxy-1,3,5-triazine was then added. The stirrer was started and the reaction vessel was heated under reduced pressure (about 50 mm.) at about 120° to 130° C. After heating for three hours, the theoretical quantity of allyl alcohol was obtained. The resulting transesterification product was a polymeric, brown, brittle solid, which softened at 100°–120° C. It was soluble in $n$-butanol, ethylene glycol monoethyl ether and cyclohexanol, but was only very slightly soluble in benzene, acetone, carbon tetrachloride and heptane.

A method of preparing 2-amino-4,6-dialloxy-1,3,5-triazine and other unsaturated monohydric alcohol esters of ammelide is given in the copending application of James R. Dudley, Serial No. 700,840, filed October 2, 1946.

EXAMPLE 2

|  | Parts | Approx. Mol Ratio |
|---|---|---|
| 2-Amino-4,6-dimethoxy-1,3,5-triazine | 156.0 | 1 |
| Diethylene glycol | 106.0 | 1 |
| Sodium (in 32 parts methanol) | 1.84 | |

To 106 parts of diethylene glycol were added 156 parts of 2-amino-4,6-dimethoxy-1,3,5-triazine and about 32 parts of methanol containing 1.84 parts of metallic sodium. The mixture was stirred and heated under vacuum as follows:

| Total Time, in Hours | Temp., ° C. | Mm. Pressure |
|---|---|---|
| 0 | 65 | 28 |
| 1 | 95 | 12 |
| 2 | 90 | 11 |
| 3 | 133 | 11 |
| 4 | 146 | 10 |
| 5 | 146 | 11 |
| 6 | 183 | 12 |

A yield of 217 parts of the resinous transesterification product resulted.

The 2-amino-4,6-dimethoxy-1,3,5-triazine is prepared, for example, by heating under reflux for 30 minutes at the boiling temperature of the reaction mass a mixture of 0.5 mol 2-amino-4,6-dichloro-1,3,5-triazine, 400 cc. methanol and 1 mol NaOH. The reaction mass is poured into an equal volume of water from which 2-amino-4,6-dimethoxy-1,3,5-triazine, M. P. 219° C., is separated by filtration in a 79% yield. A further yield of 13% is obtained upon evaporation of the filtrate.

EXAMPLE 3

Same as Example 2 with the exception that 150 parts of triethylene glycol was employed in place of 106 parts of diethylene glycol. The reaction conditions were as follows:

| Total Time, in Hours | Temp., °C. | Mm. Pressure |
|---|---|---|
| 0 | 46 | |
| 14 min | 58 | 30 |
| 1 hr | 83 | 14 |
| 2 hrs | 96 | 11 |
| 3 hrs | 140 | 11 |
| 4 hrs | 153 | 13 |
| 5 hrs | 148 | 0.5 |

During the reaction period a total of about 89 parts of distillate was obtained. The yield of the resinous transesterification product was 251 parts.

EXAMPLE 4

| | Parts | Approx. Mol Ratio |
|---|---|---|
| 2-Amino-4,6-dimethoxy-1,3,5-triazine | 468.0 | 1 |
| "Polyethylene Glycol 200" [1] | 661.5 | 1 |
| Sodium (in 96 parts methanol) | 5.12 | |

[1] Note: This glycol, which is predominantly tetraethylene glycol, had an average molecular weight of approximately 220.

The same procedure was followed as described under Example 2. The reaction conditions were as follows:

| Total Time | Temp. °C. | Mm. Pressure |
|---|---|---|
| 7 min | 77 | 54 |
| 1 hr | 96 | 12 |
| 2 hrs | 97 | 11 |
| 3 hrs | 145 | 12 |
| 4 hrs | 148 | 1 |

The resulting resinous transesterification product was nearly clear and slightly soft at room temperature. It was soluble in water. A yield of 970 parts of this resinous composition was obtained.

EXAMPLE 5

Same as Example 4 with the exception that 906.3 parts of "Polyethylene Glycol 300" was used in place of "Polyethylene Glycol 200." The "Polyethylene Glycol 300," which is predominantly hexaethylene glycol, had an average molecular weight of about 302. The reaction conditions were as follows:

| Total Time | Temp. °C. | Mm. Pressure |
|---|---|---|
| 7 min | 70 | 45 |
| 1 hr | 97 | 11 |
| 2 hrs | 95 | 9 |
| 3 hrs | 153 | 14 |
| 4 hrs | 149 | 1.5 |

The yield of the resinous transesterification product, which was softer than the product of Example 4, was 1225 parts.

EXAMPLE 6

| | Parts | Approx. Mol Ratio |
|---|---|---|
| 2-Amino-4,6-dimethoxy-1,3,5-triazine | 312.0 | 1 |
| "Polyethylene Glycol 400" [1] | 846.6 | 1 |
| Sodium (in 64 parts methanol) | 3.68 | |

The same procedure was followed as described under Example 2. The "Polyethylene Glycol 400," which is predominantly nonaethylene glycol, had an average molecular weight of about 423. The reaction conditions were as follows:

| Total Time | Temp. °C. | Mm. Pressure |
|---|---|---|
| 12 min | 94 | 35 |
| 1 hr | 92 | 10 |
| 2 hrs | 90 | 17 |
| 3 hrs | 150 | 9 |
| 4 hrs | 152 | 2 |

The transesterification product of this example was softer than the product of Example 5. The yield amounted to 1050 parts.

EXAMPLE 7

| | Parts | Approx. Mol Ratio |
|---|---|---|
| 2-Amino-4,6-dimethoxy-1,3,5-triazine | 156.0 | 1 |
| "Carbowax Compound 1500" [1] | 1,440.0 | 1 |
| Sodium (in 32 parts methanol) | 1.84 | |

[1] Note: This compound, which is understood to be a mixture of high molecular weight polyethylene glycols, had an average molecular weight of about 1,440.

The same procedure was followed as described under Example 2. The reaction conditions were as follows:

| Total Time | Temp. °C. | Mm. Pressure |
|---|---|---|
| 8 min | 80 | 22 |
| 1 hr. and 8 min | 97 | 15 |
| 2 hrs | 97 | 11 |
| 3 hrs | 146 | 10 |
| 4 hrs | 153 | 2 |

During the reaction period a total of about 102 parts of distillate was obtained. The transesterification product was dark in color and had a wax-like appearance at room temperature. The yield amounted to 1525 parts.

EXAMPLE 8

|  | Parts | Approx. Mol Ratio |
|---|---|---|
| 2-Amino-4,6-dimethoxy-1,3,5-triazine | 156.0 | 1 |
| Hexamethylene glycol | 118.0 | 1 |
| Sodium (in about 17.6 parts methanol) | 1.01 | |

The same procedure was followed as described under Example 2. The reaction conditions were as follows:

| Total Time | Temp., °C. | Mm. Pressure | Remarks |
|---|---|---|---|
| 0 | | | Heat on. |
| 13 min | 100 | | Glycol melted; vacuum on. |
| 37 min | 100 | 115 | Temp. raised and pressure lowered. |
| 55 min | 150 | 62 | Solid mass in reaction vessel. Temp. raised. |
| 1 hr. and 8 min | 194 | 62 | Resin melted. |
| 2 hrs. and 8 min | 195 | 3 | Heat off. |

The reaction product, when cool, was a hard, cloudy resin. The yield amounted to 225 parts.

EXAMPLE 9

|  | Parts | Approx. Mol Ratio |
|---|---|---|
| 2-Amino-4,6-diethoxy-1,3,5-triazine | 184.0 | 1 |
| Diethylene glycol | 106.0 | 1 |
| Sodium | 2.0 | |

The sodium was dissolved in the diethylene glycol, after which the triazine derivative was added thereto. The mixture was heated while under the vacuum produced by a mechanical pump as follows:

| Total Time, in Minutes | Temp. °C. |
|---|---|
| 30 | 75-85 |
| 60 | to 125 |
| 90 | 125 |
| 105 | to 150 |
| 135 | 150 |
| 165 | 150-160 |

The amount of distillate (ethanol) obtained during the reaction period amounted to about 60 parts, which was about 67% of the theoretical. The transesterification product, when cool, was a hard, brittle resin.

The 2-amino-4,6-diethoxy-1,3,5-triazine is prepared, for example, by heating under reflux for 30 minutes at the boiling temperature of the reaction mass a mixture of 3 mols of wet 2-amino-4,6-dichloro-1,3,5-triazine, 2400 cc. ethanol and 6 mols NaOH; the wet product obtained by evaporation of the alcoholic filtrate is recrystallized from dioxane, yielding purified 2-amino-4,6-diethoxy-1,3,5-triazine having a melting point of 97°–98° C.

EXAMPLE 10

Same as Example 9 with the exception that 4 parts metallic sodium was used. The time and temperatures of reaction were as follows:

| Total Time, In Minutes | Temp., °C. |
|---|---|
| 30 | 75-85 |
| 60 | 85 |
| 75 | to 125 |
| 105 | 125 |
| 135 | 125-130 |
| 145 | to 175 |
| 175 | 175-180 |

During the reaction period a total of about 77.5 parts of distillate (ethanol) was obtained. When cooled to room temperature, the reaction product was a hard, brittle resin. This resin was heated in a receptacle placed in an oil bath maintained at about 200° C., and dry nitrogen was bubbled through the resin, which was just soft at about 200° C., for about 18 hours. The resin did not become discolored following this treatment. The treated resin also was hard and brittle when cool. It was soluble in formalin.

EXAMPLE 11

|  | Parts | Approx. Mol Ratio |
|---|---|---|
| 2-Amino-4,6-diethoxy-1,3,5-triazine | 552 | 1 |
| Hexamethylene glycol | 354 | 1 |
| Sodium (in about 48 parts ethanol) | 3 | |

Essentially the same procedure was followed as described under Example 2. The reaction conditions were as follows:

| Total Time | Temp., °C. | Mm. Pressure | Remarks |
|---|---|---|---|
| 0 | | | Started heating. |
| 15 min | 100 | | Clear melt. Vacuum on and ethanol began to distill. |
| 33 min | 104 | 17.5 | |
| 105 min | 102 | 18 | Temp. raised and pressure reduced. |
| 140 min | 125 | 8 | |
| 173 min | 150 | 10.5 | |
| 183 min | 151 | 13 | Heat off. |

The amount of distillate obtained during the reaction period was about 270 parts. The transesterification product, when cool, was a hard, brittle, opaque resin.

EXAMPLE 12

|  | Parts | Approx. Mol Ratio |
|---|---|---|
| 2-Amino-4,6-diethoxy-1,3,5-triazine | 184 | 1 |
| Decamethylene glycol | 174 | 1 |
| Sodium (in about 18 parts ethanol) | 1 | |

A mixture of the above ingredients was heated for 1 hour at 105°–125° C. under a pressure of 75–100 mm., during which time about 60 parts of ethanol was obtained as a distillate. After standing for about 16 hours at room temperature, heating was continued for two more hours at about 150° C. under a pressure of 2–5 mm., during which time an additional 22.5 parts, making a total of about 82.5 parts, of ethanol was obtained. The resulting resin, which was obtained in a yield amounting to 288 parts, was light yellow in color and sticky at room temperature.

EXAMPLE 13

|  | Parts | Approx. Mol Ratio |
|---|---|---|
| 2-Amino-4,6-diethoxy-1,3,5-triazine | 184 | 1 |
| 2-Ethyl-1,3-hexanediol | 146 | 1 |
| Sodium | 2 | |

The sodium was dissolved in the 2-ethyl-1,3-hexanediol by heating a vessel containing the same on a steam bath for about 6 hours, after which the triazine derivative was added thereto. The mixture was heated while under the vacuum produced by a mechanical pump as follows:

| Total Time | Temp., °C. | Remarks |
|---|---|---|
| 0 | | Heat on. |
| 12 min | 70 | Vacuum on. |
| 40 min | 100 | |
| 78 min | 100 | Full vacuum. |
| 2 hrs. and 40 min | 107 | 42.5 parts distillate obtained. |
| 3 hrs. and 40 min | 138 | |
| 4 hrs. and 40 min | 140 | 52.5 parts distillate obtained. |
| 5 hrs. and 40 min | 153 | 65 parts distillate obtained. |

The last 15 parts of the distillate was almost all unreacted 2-ethyl-1,3-hexanediol. When cool, the resinous product was hard but sticky. It was obtained in a yield amounting to 259 parts.

EXAMPLE 14

|  | Parts | Approx. Mol Ratio |
|---|---|---|
| 2-Cyclohexylamino-4,6-dimethoxy-1,3,5-triazine (M.P. 127°-129° C.) | 238 | 1 |
| Diethylene glycol | 106 | 1 |
| Sodium | 1 | |

The metallic sodium was added to the ethylene glycol, and after it had dissolved the triazine derivative was added. The mixture was heated as described under Example 13. At 100° C. there was a vigorous evolution of methanol. After heating under vacuum for 1 hour at 100° C., 70% of the theoretical amount of methanol had been evolved. The transesterification product was a hard, brittle resin.

The 2-cyclohexylamino-4,6-dimethoxy-1,3,5-triazine was prepared by pouring a hot solution of 185 parts of cyanuric chloride in about 316 parts of acetone into 1000 parts of cracked ice. The temperature of the resulting slurry was −10° C. To it was added 99 parts of cyclohexylamine in 10 minutes with the temperature rising to −5° C. and the mass becoming neutral very quickly, after which 53 parts of sodium carbonate was added thereto. The temperature slowly increased to +10° C. where it was held by means of an ice bath, and carbon dioxide was evolved over a 2-hour period. The product, 2-cyclohexylamino-4,6-dichloro-1,3,5-triazine, was an oil that was separated, washed with water and dried in a vacuum desiccator.

A solution of 56 parts of sodium hydroxide in about 560 parts of methanol was prepared, and to it was slowly added 173 parts of the above oil while cooling the mass to keep the temperature at 35°-40° C. The mixture was then refluxed for 30 minutes and filtered hot. On cooling, impure crystals of 2-cyclohexylamino-4,6-dimethoxy-1,3,5-triazine separated from the filtrate. The yield was increased by diluting the filtrate with water. The solid was recrystallized from hot 50% methanol and dried at 105° C. The purified 2-cyclohexylamino-4,6-dimethoxy-1,3,5-triazine had a melting point of 127°-129° C. A small sample recrystallized from hot 50% acetone gave a melting point of 128°-129° C.

EXAMPLE 15

|  | Parts | Approx. Mol Ratio |
|---|---|---|
| 2-Octadecylamino-4,6-dimethoxy-1,3,5-triazine | 315 | 1 |
| "Polyethylene Glycol 300" | 233 | 1 |
| Sodium | 1.5 | |

The sodium was added to the polyethylene glycol, and the resulting mixture was heated at about 100° to 125° C. until the sodium had dissolved. The triazine derivative was now added, and the reaction mass was heated with stirring under reduced pressure for about 12 hours at a temperature ranging from about 90° to 155° C. and a reduced pressure of the order of about 10 to about 17 mm. For about 7 hours of this reaction period the reaction mass was at a temperature of about 140° to 155° C. About 32.3 parts of distillate was collected during this reaction period. The yield of the transesterification product amounted to 514 parts. It was a soft, brown resin, and gave a cloudy dispersion in water.

2-octadecylamino-4,6-dimethoxy-1,3,5-triazine is prepared, for example, by adding 168 parts of sodium bicarbonate and 185 parts of cyanuric chloride to 500 parts of a solution containing 90% methyl alcohol and 10% water. The mixed ingredients are allowed to react at 30° to 35° C. until the evolution of carbon dioxide has diminished, after which the reaction mass is heated to reflux temperature in 15 minutes and thereafter refluxed for 25 minutes. The resulting 2-chloro-4,6-dimethoxy-1,3,5-triazine is cooled to 35° C., after which 269 parts of octadecylamine is added slowly while cooling the mass, followed by the addition of 84 parts of sodium bicarbonate. The resulting mixture is heated under reflux at the boiling temperature of the mass for 1 hour, cooled, diluted with water and filtered. The crude, waxy 2-octadecylamino-4,6-dimethoxy-1,3,5-triazine produced in this manner is mixed with 1000 parts of a 1% solution of sodium hydroxide, warmed to 70° C. and then allowed to cool slowly. The solid layer that separates is removed, washed with water and dried at 50° C., thereby yielding purified 2-octadecylamino-4,6-dimethoxy-1,3,5-triazine.

EXAMPLE 16

|  | Parts | Approx. Mol Ratio |
|---|---|---|
| 2-Dodecylamino-4,6-dimethoxy-1,3,5-triazine | 275.0 | 1 |
| "Polyethylene Glycol 300" | 257.0 | 1 |
| Sodium | 1.7 | |

The sodium was added to the polyethylene glycol, and the resulting mixture was heated at 100° to 125° C. until the sodium had dissolved. The triazine derivative was now added, and the mixture heated with stirring under vacuum for about 11 hours at a temperature ranging from about 70° to 150° C. and a reduced pressure varying from about 70 mm. down to 12 mm. For about 5 hours of this reaction period the reaction mass was at a temperature of approximately 145° to 150° C. and at a pressure of the order of 12 to 13 mm. The yield of distillate amounted to about 36.2 parts. The transesterification product, which was a soft, cloudy, brown, resin, was obtained in a yield amounting to 495 parts. It was dispersible in water.

The 2-dodecylamino-4,6-dimethoxy-1,3,5-triazine is prepared in essentially the same manner as described under Example 15 with reference to the production of 2-octadecylamino-4,6-dimethoxy-1,3,5-triazine. However, in this case the crude product was dissolved in ether and then washed with dilute alkali and water. The ether was evaporated by heating the washed material on a steam bath, and drying the purified product in a vacuum desiccator over sulfuric acid.

EXAMPLE 17

|  | Parts | Approx. Mol Ratio |
|---|---|---|
| 2-Amino-4,6-dimethoxy-1,3,5-triazine | 780 | 1 |
| Ethylene glycol | 620 | 2 |
| Sodium | 5 | |
| Benzene | 1,760 | |

The sodium was dissolved in the ethylene glycol in a 3-necked reaction vessel provided with a stirrer and a fractionating column, after which the triazine derivative and benzene were added thereto. The mass was heated under atmospheric pressure. A constant boiling mixture boiling at 56° C. and which contained about 39% of methanol, by weight, was distilled off. After further heating under atmospheric pressure at a bath temperature of 120° C. for 2½ days, approximately 50% of the theoretical amount of methanol was obtained, leaving the primary product of the reaction. This example illustrates the preparation of a reaction product by reacting the triazine derivative and the polyhydric alcohol, specifically ethylene glycol, in the presence of an inert solvent.

EXAMPLE 18

|  | Parts | Approx. Mol Ratio |
|---|---|---|
| 2-Amino-4,6-dimethoxy-1,3,5-triazine | 780 | 1 |
| Ethylene glycol | 620 | 2 |
| Sodium | 5 | |

The triazine derivative was added to the glycol in which the sodium had been dissolved. After heating the resulting mixture at atmospheric pressure for 65 minutes at 128° to 149° C. approximately 50% of the theoretical amount of methanol was obtained. The reaction mass was cooled and an additional 5 parts of sodium was added thereto. At about 100° C. the sodium dissolved. The mass was heated to 120° C. and then allowed to stand at room temperature for about 16 hours. The reaction mass was then further heated for 4 hours and 50 minutes within the temperature range of 155° to 192° C. (most of the time at 155° to 176° C.), during which period an additional 20% of methanol was collected. The odor of ammonia given off toward the end of the reaction period indicated that side reactions were taking place in addition to the primary reaction between the glycol and the triazine derivative. A solid reaction product which was partially water-soluble was obtained.

EXAMPLE 19

|  | Parts | Approx. Mol Ratio |
|---|---|---|
| 2-Amino-4,6-diethoxy-1,3,5-triazine | 610 | 1 |
| Ethylene glycol | 620 | 3 |
| Sodium | 5 | |

The same general procedure was followed as described under Example 18. After heating the reaction mixture at atmospheric pressure for 75 minutes at 100° to 135° C., approximately 59.2% of the theoretical amount of ethanol was collected. Additional heating and further amounts of sodium did not increase the amount of ethanol evolved.

EXAMPLE 20

|  | Parts | Approx. Mol Ratio |
|---|---|---|
| 2-Butylamino-4,6-dimethoxy-1,3,5-triazine | 700 | 1 |
| Ethylene glycol | 410 | 2 |
| Sodium | 5 | |

The reaction of a mixture of the above ingredients went 50% to completion upon heating at atmospheric pressure for only 20 minutes at 107° to 124° C., after 15 minutes' heating to bring the mass to reaction temperature. Heating for an additional 3 hours and 40 minutes at 124°–154° C., including about 3 hours and 25 minutes at 150°–154° C., produced a total of 82.5% of the theoretical amount of methanol. The excess, unreacted glycol is removed by heating the mass under reduced pressure. The reaction product of this example was soluble in alkali, indicating that a substantial quantity of hydroxytriazines was present therein.

EXAMPLE 21

|  | Parts | Approx. Mol Ratio |
|---|---|---|
| 2-Amino-4,6-dimethoxy-1,3,5-triazine | 520 | 1 |
| Diethylene glycol | 710 | 2 |
| Sodium | 5 | |

The sodium was dissolved in the glycol and the triazine derivative added thereto. Upon heating the resulting thick paste at atmospheric pressure for 10 minutes at 120° to 135° C., approximately 41% of the theoretical amount of methanol was distilled from the reaction mass. Further heating for about 3½ to 4 hours at a maximum temperature of 150° C. caused the reaction to proceed to 65.4% completion as indicated by the amount of methanol collected. A solid material that was somewhat softer than the product of Example 18 was obtained.

EXAMPLE 22

Same as Example 21 with the exception that after bringing the reaction mixture to a temperature of 115° C. in 15 minutes, further heating was continued under a reduced pressure of 210 mm. down to 100 mm. at a temperature of 115° to 150° C. for a total of 128 minutes. During this heating period 89% of the theoretical amount of methanol was evolved. A clear, almost colorless reaction product was obtained.

EXAMPLE 23

|  | Parts | Approx. Mol Ratio |
|---|---|---|
| 2-Amino-4,6-dimethoxy-1,3,5-triazine | 520 | 1 |
| "Polyethylene Glycol 400" | 1,330 | 1 |
| Sodium (dissolved in about 103 parts methanol) | 10 | |

The above ingredients were mixed and heated together at atmospheric pressure for a little over 6 hours at a temperature of 124° to 138° C. Approximately 43.5% of the theoretical amount of methanol was collected during the formation of the resinous transesterification product.

EXAMPLE 24

|  | Parts | Approx. Mol Ratio |
|---|---|---|
| 2-Amino-4,6-diethoxy-1,3,5-triazine | 460 | 1 |
| "Polyethylene Glycol 200" | 500 | 1 |
| Sodium (dissolved in about 127 parts methanol) | 10 | |

After heating the mixture of the above ingredients for 3 hours at 113° to 150° C. under a reduced pressure of about 200 mm. and for about 1 hour at 150° C. under a reduced pressure of about 10 mm., approximately 152 parts of ethanol was collected. An additional 16 parts of ethanol was obtained when the reaction mass was heated for an additional 8 hours at 150° C. under a pressure of about 12 mm. The total quantity of ethanol collected was 72% of the theoretical amount. The reaction product was a clear, yellow, tacky, resinous material.

In the following Examples 25 to 31, inclusive, the glycol was introduced into the reaction vessel and the indicated amount of metallic sodium was dissolved in the glycol, by heating if necessary. (In some cases, the sodium was introduced as sodium methoxide in a measured volume of methanol.) The aminodialkoxytriazine was then added, and the vessel was fitted with a stirrer and distilling head. A condenser, a receiver cooled in Dry Ice, and a pumping system were arranged in the usual manner for low-pressure distillation. The reaction vessel was heated by an oil bath, and the pressure in the system was adjusted by means of a variable leak in the pump line. The pressures used depended upon the rate of evolution of methanol, the boiling point of the glycol, and the foaming tendencies of the reaction mixture. Usually pressures of 200–400 mm. were used at the start of the reaction, and the pressure was decreased gradually to 1-10 mm. at the end.

The degree of reaction at any time was calculated from the weight of material lost from the reaction vessel (or found in the receiver). The identity of the volatile material was checked by the refractive index of the distillate. In certain cases where glycol was carried out of the reaction vessel by the methanol evolved, the composition of the distillate was calculated from its refractive index, and the degree of reaction calculated from this composition.

By the term "effective time" mentioned in the tables is meant the number of hours of heating during which the resin-forming reaction took place. The degree of reaction is calculated on a basis of 100% for complete displacement of the simple alcohol from the reaction mixture. However, the sodium retains an equivalent amount of simple alcohol and glycol as alkoxide. Therefore, for example, if 10 mol % of sodium (based on the molar amount of triazine derivative) is used as the catalyst, the upper limit for the degree of reaction as given in Examples 25 to 31, inclusive, is approximately 97.5%.

EXAMPLE 25

*Resins from 2-amino-4,6-dibutoxy-1,3,5-triazine*

| Glycol | Mol Per Cent Sodium (Based on Triazine Used) | Reaction Conditions (Hours at °C. at mm.) | Degree of Reaction Per Cent | Description of Resinous Product |
|---|---|---|---|---|
| Decamethylene glycol | 5 | 1.5 hrs. at 120° at 1–2 mm.<br>+1 hrs. at 120° at 1–2 mm.<br>+1.5 hrs. at 120° at 1–2 mm.<br>+1.5 hrs. at 170° at 1–2 mm.<br>+1 hr. at 170° at 1–2 mm.<br>6.5 hrs. effective time. | 48<br>60<br>65<br>86<br>88 | Clear, tan solid, hard and brittle at room temperature, soluble in ethylene glycol monomethyl ether, insoluble in butanol, M. P. ca. 80° C. |
| Do | 10 | 2 hrs. at 165° at 15 mm.<br>+3 hrs. at 180° at 1–2 mm.<br>+3 hrs. at 180° at 1–2 mm.<br>8 hrs. effective time. | 55<br>75<br>82.5 | Very hard, brittle, soluble in ethylene glycol monomethyl ether, insoluble in butanol. |
| Triethylene glycol | 10 | 1 hr. at 180° at 760 mm.<br>+1 hr. at 180° at 15 mm.<br>+6.5 hrs. at 180° at 15 mm.<br>8.5 hrs. effective time. | 55<br>66<br>72.5 | Tan-colored, tacky solid, soluble in ethylene glycol monomethyl ether, insoluble in butanol. |
| Do | 4 | 0.5 hr. at 117° at 100 mm.<br>+0.5 hr. at 117° at 100 mm.<br>+0.75 hr. at 117° at 1–2 mm.<br>+0.5 hr. at 180° at 1–2 mm.<br>+1.0 hr. at 145° at 1–2 mm.<br>+1.0 hr. at 155° at 1–2 mm.<br>+0.5 hr. at 175° at 1–2 mm.<br>4.75 hrs. effective time. | 32<br>55<br>60<br>75<br>82<br>86<br>87 | Moderately soft solid, very dark color, soluble in ethylene glycol monomethyl ether, insoluble in butanol. |

The 2-amino-4,6-dibutoxy-1,3,5-triazine is prepared, for example, by heating for 2 hours at 80° C. a mixture of 1 mol of wet 2-amino-4,6-dichloro-1,3,5-triazine, 800 cc. butanol and 2 mols NaOH. The product is isolated by crystallization from the hot filtrate and evaporation of the filtrate. It has a melting point of 100° C.

EXAMPLE 26
Resin from 2-amino-4,6-dimethoxy-1,3,5-triazine

| Glycol | Mol Per Cent Sodium (Based on Triazine Used) | Reaction Conditions (Hours at °C. at mm.) | Degree of Reaction Per Cent | Description of Resinous Product |
|---|---|---|---|---|
| Decamethylene glycol | 4 | 0.75 hr. at 120° at 100 mm.<br>(+0.75 hr. at 120° at 10 mm.)<br>+1.0 hr. at 140° at 2 mm.<br>+1.0 hr. at 155° at 2 mm.<br>(+1.0 hr. at 180° at 2 mm.)<br>3.5 hrs. effective time. | 55<br>No change<br>66<br>75<br>No change | Hard, brittle, slightly cloudy, light color, soluble in ethylene glycol monomethyl ether, insoluble in butanol. |

Reactants were completely compatible only after 2.5 hrs.

EXAMPLE 27
Resins from 2-diethylamino-4,6-dimethoxy-1,3,5-triazine

| Glycol | Mol Percent Sodium (Based on Triazine Used) | Reaction Conditions (Hours at °C. at mm.) | Degree of Reaction Per Cent | Description of Resinous Product |
|---|---|---|---|---|
| Triethylene glycol | 4 | 0.33 hr. at 117° at 100–10 mm.<br>+0.50 hr. at 117° at 2 mm.<br>0.83 hr. effective time. | 83<br>88 | Clear, brown syrup; very viscous. |
| Ethylene glycol | 5 | 0.5 hr. at 115° at 200 mm.<br>+0.25 hr. at 117° at 200–70 mm.<br>+1.0 hr. at 120° at 1 mm.<br>+0.5 hr. at 120° at 1 mm.<br>(+1.5 hrs. at 150° at 1 mm.)<br>2.25 hrs. effective time. | 64<br>69<br>73<br>No change | Opaque wax. (Reaction mixture became opaque after having been heated 2 hrs.) |
| Diethylene glycol | 5 | 0.5 hr. at 115° at 100 mm.<br>+0.75 hr. at 115° at 2 mm.<br>+0.25 hr. at 160° at 2 mm.<br>1.5 hrs. effective time. | 80<br>92<br>94–96 | Clear, tacky gum, soluble in butanol. |
| Decamethylene glycol | 10 | 2.5 hrs. at 120° at 25–2 mm.<br>(+3.0 hrs. at 120° at 1 mm.)<br>+2.0 hrs. at 150° at 1 mm.<br>+2.0 hrs. at 180° at 1 mm. approx.<br>6.5 hrs. effective time. | 87.5<br>No change<br>91.0<br>97.5 | Very viscous syrup, light color, soluble in butanol. |
| Decamethylene glycol | 4 | 0.66 hr. at 120° at 600 mm.<br>+1.0 hr. at 120° at 600–300 mm.<br>(+0.5 hr. at 120° at 2 mm.)<br>+0.66 hr. at 150° at 2 mm.<br>+2.0 hrs. at 150° at 2 mm.<br>+2.0 hrs. at 185° at 2 mm.<br>+2.0 hrs. at 185° at 2 mm.<br>8.5 hrs. effective time. | 60<br>72<br>No change<br>76<br>83<br>93<br>96 | Tan-colored, very viscous syrup, soluble in butanol. (The catalyst was insoluble at the end of the reaction.) |
| 2-Ethyl-1,3-hexanediol | 4 | 0.5 hr. at 120° at 400–2 mm. | 90–98 | Very clear, light-colored, hard and brittle, melting point, ca. 65° C. |

The 2-diethylamino-4,6-dimethoxy-1,3,5-triazine is prepared, for example, by dissolving 553 parts cyanuric chloride in about 950 parts of hot acetone, and filtering the resulting solution into 1800 parts of well stirred ice water. To the resulting suspension of cyanuric chloride, 219.3 parts of diethylamine is added gradually over a period of 1½ hours while the temperature of the reaction mixture is kept at 5° to 10° C. by external cooling. Sodium carbonate (159 parts) is then added at 5°–10° C. over a period of 20 minutes and thereafter the mixture is stirred for an additional 40 minutes at 0° to 5° C. The creamy mixture is then filtered, and the separated solid is washed with water and filtered as dry as possible. The crude 2-diethylamino-4,6-dichloro-1,3,5-triazine is dried in a vacuum desiccator over sulfuric acid. It has a melting point of 76°–78° C. A small portion of this product, after recrystallization from a syrup in benzene yields large needles which melt at 77.5°–79° C.

One hundred and forty-three (143) parts of the dry, crude 2-diethylamino-4,6-dichloro-1,3,5-triazine is dissolved in about 238 parts of acetone, and this solution is added over a period of 30 minutes to a solution of 41 parts of sodium hydroxide in about 478 parts methanol. During the time of addition, the reaction temperature is kept at 25° to 35° C. and following the addition the mixture is heated to 60° C. for 2½ hours. The mixture is filtered hot, and the filtrate is evaporated to 250 parts which is then poured into 2000 parts of ice water. The oil which precipitates crystallizes after standing for 3 or 4 hours at room temperature. The crystals of 2-diethylamino-4,6-dimethoxy-1,3,5-triazine are filtered, washed with water and dried over sulfuric acid in a vacuum desiccator. The crude product melts at 34°–35° C. A sample recrystallized from benzene melts at 33°–34° C.

EXAMPLE 28

*Resins from 2-phenylamino-4,6-dimethoxy-1,3,5-triazine*

| Glycol | Mol percent Sodium (Based on Triazine used) | Reaction Conditions (Hours at °C. at mm.) | Degree of Reaction Per Cent | Description of Resinous Product |
|---|---|---|---|---|
| Decamethylene glycol | 10 | 1.5 hrs. at 120° at 200-2 mm. <br> +1.5 hrs. at 120° at 2 mm. <br> (+2 hrs. at 170° at 2 mm.) <br><br> 3.0 hrs. effective time. | 59 <br> 66 <br> No change | Moderately hard, brittle, cloudy, soluble in butanol, M. P., ca. 50° C. |
| 2-Ethyl-1,3-hexanediol | 8 | 0.5 hr. at 100° at 20 mm. <br> +0.5 hr. at 110° at 20 mm. <br> +0.75 hr. at 160° at 50 mm. <br> +0.75 hr. at 165° at 50 mm. <br> (+1.5 hrs. at 180° at 15 mm.) <br><br> 2.5 hrs. effective time. | 58 <br> 67 <br> 75 <br> 78 <br> Slight decomposition. | Very clear, red color, very hard and brittle, soluble in butanol, M. P. 80-85° C. |
| Triethylene glycol | 8 | 0.5 hr. at 120° at 760 mm. <br> +0.5 hr. at 120° at 15 mm. <br> +1.0 hr. at 120° at 20 mm. <br> (+1.0 hr. at 150° at 20 mm.) <br> +1.5 hrs. at 180° at 15 mm.) <br> ((+3.0 hrs. at 180° at 15 mm.) <br><br> 3.5 hrs. effective time. | 53 <br> 66 <br> No change <br> 70 <br> Decomposition. | Hard brittle, clear, dark amber color, M. P. ca., 50° C. |

The 2-phenylamino-4,6-dimethoxy-1,3,5-triazine is prepared, for example, by filtering into 1500 parts of stirred ice water a solution of 276.6 parts (or 295 parts of 96% soluble crude material) of cyanuric chloride in 584 parts of hot acetone, and to the resulting suspension 139.5 parts of aniline is added dropwise while the reaction mixture is kept at 3° to 6° C. by external cooling. Then 79.5 parts of sodium carbonate is added gradually at the same temperature, after which the reaction mixture is stirred for 1 hour at 0° to 5° C. The resulting crude 2-phenylamino-4,6-dichloro-1,3,5-triazine is filtered as dry as possible, in which form it contains about 50% of water. This material, amounting to 725 parts, is added gradually at 25° to 35° C. to a solution of 123 parts of sodium hydroxide in about 950 parts of methanol. The mixture is then heated at 65° C. for 2 hours. The hot reaction mass is filtered, and the filtrate is poured into 5000 parts of cold water. The oil which precipitates crystallizes at once, giving 180 parts of 2-phenylamino-4,6-dimethoxy-1,3,5-triazine, M. P. 128.5°-130.5° C., after drying at 100° C. The insoluble residue containing additional triazine derivative is mixed with 4000 parts of water to dissolve the sodium chloride. The 2-phenylamino-4,6-dimethoxy-1,3,5-triazine is separated by filtration and purified.

EXAMPLE 29

*Resin from 2-butylamino-4,6-dimethoxy-1,3,5-triazine*

| Glycol | Mol Per Cent Sodium (Based on Triazine Used) | Reaction Conditions (Hours at °C. at mm.) | Degree of Reaction Per Cent | Description of Resinous Product |
|---|---|---|---|---|
| Triethylene glycol | 4 | 0.5 hr. at 115° at 760-160 mm. <br> +0.5 hr. at 110-150° at 160 mm. <br> +0.5 hr. at 180° at 15 mm. <br><br> 1.5 hrs. effective time. | 62.5 <br> 82.5 <br> 90.5 | Soft, tacky, cloudy. (The catalyst was insoluble at the end of the reaction.) |

The 2-butylamino-4,6-dimethoxy-1,3,5-triazine is prepared, for example, by filtering into 750 parts of ice water a solution of 93 parts of cyanuric chloride in about 198 parts of hot acetone. To the resulting suspension of cyanuric chloride 36.6 parts of butylamine (n-butylamine) is added dropwise while the reaction mixture is kept at 0° to 5° C. by external cooling. Then 26.5 parts of sodium carbonate is added gradually at the same temperature. The mixture is stirred for 1 hour after the reactants have been added. The resulting crude 2-butylamino-4,6-dichloro-1,3,5-triazine is filtered as dry as possible, after which it is dried in a vacuum desiccator over sulfuric acid to obtain a crude material having a melting point of 48°-50° C. After recrystallization from benzene the melting point of the purified material is 51°-52° C.

Forty-five parts of the recrystallized 2-butyl-amino-4,6-dichloro-1,3,5-triazine is added gradually at 30°–35° C. to a solution of 16.4 parts of sodium hydroxide in about 127 parts of methanol. The mixture is then heated at 65° C. for 1½ hours, after which it is filtered hot and the filtrate poured into 600 parts of cold water. The precipitated oil crystallizes rapidly, giving 38.5 parts of 2-butylamino-4,6-dimethoxy-1,3,5-triazine, M. P. 65.0°–65.5° C.

EXAMPLE 30

*Resin from 2-(N-methyl-N-phenylamino)-4,6-dimethoxy-1,3,5-triazine* mixture is maintained at 35° to 45° C., external cooling also being employed. When the addition is complete, the mixture is heated slowly to 60° C. and kept at this temperature for 1½ hours. The hot mixture is then filtered and the filtrate is poured into 2500 parts of water. The precipitated oil crystallizes slowly at room temperature. The crude, crystalline 2-(N-methyl-N-phenylamino)-4,6-dimethoxy-1,3,5-triazine amounts to 115 parts after drying in a vacuum desiccator over sulfuric acid and melts at 46° to 47° C. A purer product melting at 51°–52° C. is obtained by redissolving the crude material in hot methanol, filtering the resulting solution, and repre-

| Glycol | Mol Per Cent Sodium (Based on Triazine Used) | Reaction Conditions (Hours at ° C. at mm.) | Degree of Reaction, Per Cent | Description of Resinous Product |
|---|---|---|---|---|
| Triethylene glycol | 4 | 0.5 hr. at 120° at 400–2 mm<br>+1.0 hr. at 120° at 2 mm<br>1.5 hrs. effective time. | 73<br>89 | Moderately soft, tacky. |

The 2-(N-methyl-N-phenylamino)-4,6-dimethoxy-1,3,5-triazine is prepared, for example, by dissolving 553 parts of cyanuric chloride in about 1550 parts of hot dioxane, and filtering the resulting solution into 1800 parts of well-stirred ice water. To the suspension of cyanuric chloride thereby obtained is gradually added 321 parts of methylaniline over a period of 1 hour while keeping the temperature of the reaction mixture at 4° to 8° C. One hundred and fifty-nine parts of sodium carbonate is then added to the cold mixture to neutralize the hydrochloric acid formed by the reaction. The neutral mixture is filtered as dry as possible. The water that remains in the crude material is removed by heating it in a 100° C. oven. The dry 2-(N-methyl-N-phenylamino)-4,6-dichloro-1,3,5-triazine amounts to 702 parts and has a melting point of 130°–131.5° C. A sample recrystallized from benzene forms large, clear crystals, M. P. 130.5°–131.5° C.

One hundred and twenty-seven and one-half parts of the crude triazine derivative is added gradually to 41 parts of sodium hydroxide in about 475 parts of methanol. The rate of addition is such that the temperature of the reaction cipitating the compound by pouring the solution into water.

EXAMPLE 31

*Mixed resins*

| Triazine | Glycol | Mol Per Cent Sodium (Based on Triazine Used) | Reaction Conditions (Hours at °C at mm.) | Degree of Reaction Per Cent | Description of Resinous Product |
|---|---|---|---|---|---|
| 0.5 mol 2-(N-methyl-N-phenylamino)-4,6-dimethoxy-1,3,5-triazine and 0.5 mol 2-amino-4,6-dimethoxy-1,3,5-triazine. | 1 mol triethylene glycol. | 4 (at start)<br><br><br><br>Increased to 8%. | 0.5 hr. at 110° at 760–200 mm<br>+0.5 hr. at 125–130° at 60 mm<br><br>+0.75 hr. at 140–150° at 10 mm<br>+2.0 hrs. at 145° at 10 mm<br>(+1.5 hrs. at 165° at 10 mm)<br>+1.5 hrs. at 125° at 10 mm<br>+2.0 hrs. at 180–190° at 10 mm | 39<br>48<br>mixture became homogeneous at this point.<br>55<br>59<br>No change<br>66<br>Decomp. | Soft, tacky, brittle, dark brown color, fairly clear, some aminodimethoxy triazine sublimed. |
| 0.5 mol 2-amino-4,6-diethoxy-1,3,5-triazine and 0.5 mol 2-diethylamino-4,6-dimethoxy-1,3,5-triazine. | 1 mol triethylene glycol. | 8 | 1.25 hrs. at 120° at 760–10 mm<br><br>+1.0 hr. at 140° at 10 mm<br><br>+3.0 hrs. at 170° at 10 mm | 87% ethanol recovered<br>44% methanol recovered<br>98% ethanol recovered.<br>53% methanol recovered.<br>100% ethanol recovered.<br>59% methanol recovered.<br>159/2=79.5% reacted. | Very light color, very clear, stiff syrup, does not flow at room temperature. |

EXAMPLE 32

The simultaneous transesterification of two different compounds of the kind embraced by Formula I, more particularly two different aminodialkoxytriazines, with a polyhydric alcohol, specifically a glycol, is exemplified in this example wherein the results are shown below in tabular form. The resin-forming reactions were carried out as indicated hereinbefore, at optimum temperatures between 100° and 150° C. and under reduced pressure, until it was evident that the reaction at the temperature employed had gone substantially to completion. The composition of the mixed alcoholic distillate was calculated from its refractive index by using the known linear relation between the refractive index and the composition expressed in weight per cent of either component. In the table 2-amino-4,6-diethoxy-1,3,5-triazine and 2-(N-methyl-N-phenylamino)-1,3,5-triazine are abbreviated to "ADET" and "MPADMT," respectively. For purpose of comparison, blank preparations where a single triazine derivative was used are included in the table.

cation of 2-(N-methyl-N-phenylamino)-4,6 - dimethoxy - 1,3,5-triazine and 2 - amino - 4,6-diethoxy-1,3,5-triazine with triethylene glycol.

A mixture of 2-(N-methyl-N-phenylamino)-4,6-dimethoxy-1,3,5-triazine and triethylene gly-

TABLE I

*Simultaneous transesterification of two 2-amino-4,6-dialkoxy-1,3,5-triazines with glycols*

| Glycol | Mol Per Cent of Components of Triazine Mixture | Catalyst (Na) mols/mol of Triazine | Per Cent Alcohol Evolved after x Hours at Optimum Temperatures | | | | Properties of the Resinous Product |
|---|---|---|---|---|---|---|---|
| | | | 1 | 2 | 3 | 4 | |
| Triethylene | ADET 100 | 0.04 | 39% EtOH | 60 | 63–67 | | |
| Do | ADET 50 / MPADMT 50 | 0.04 | 61% EtOH / 41% MeOH | 65 / 44 | 74 / 48.5 | | |
| Do | ADET 25 / MPADMT 75 | 0.04 | 100% EtOH / 48% MeOH | 63.5 | | 79 | Tacky syrup, very light colored and fairly clear. |
| Do | MPADMT 100 | 0.04 | 40 min / 83% MeOH | 75 min / 88 | | | Soft, tacky syrup, clear and light colored. |
| Do | ADET 100 | 0.08 | 57.5% EtOH | 76 | | 80.5 | Slightly soft, very clear and light colored. |
| Do | ADET 75 / MPADMT 25 | 0.08 | 62% EtOH / 50% MeOH | | 88 / 59 | | Soft and tacky, very clear and light colored. |
| Do | ADET 50 / MPADMT 50 | 0.08 | 71% EtOH / 50% MeOH | | | 89 / 61 | Stiff, tacky syrup, very clear and light amber-colored. |
| Do | ADET 25 / MPADMT 75 | 0.08 | 96% EtOH / 44% MeOH | 100 / 60 | 66 | | Stiff, tacky syrup; very clear and fairly light-colored. |
| Do | MPADMT 100 | 0.08 | 50% MeOH | 78 | 83 | | Soft, tacky syrup, very clear and light-colored. |
| | | | | | | 5 hours | |
| Do | ADET 50 / 2-Diethylamino-4,6-dimethoxy-1,3,5-triazine 50 | 0.08 | 87% EtOH / 44% MeOH | 96 / 53 | | 100 / 59 | Stiff, tacky syrup; very light-colored. |
| Hexamethylene | ADET 25 / MPADMT 75 | 0.04 | 67.5% EtOH / 49% MeOH | 85 / 67.5 | | | Clear, hard, and very light-colored. |

The foregoing results clearly indicate that in mixtures of certain triazine derivatives of the kind covered by Formula I, specifically 2-amino-4,6-diethoxy-1,3,5-triazine and 2-(N - methyl - N - phenylamino)-4,6-dimethoxy-1,3,5 - triazine, the reactivity of the former triazine derivative toward triethylene glycol is greatly enhanced by the presence of the latter which, however, reacts more sluggishly than when it is used alone. In order to obtain a sufficiently high degree of reaction of the latter triazine derivative to produce a relatively high molecular weight resin, the molar ratio of 2-amino-4,6-diethoxy-1,3,5-triazine to 2 - (N-methyl-N-phenylamino)-4,6 - dimethoxy - 1,3,5-triazine should not be greater than about 1 to 3, and the catalyst concentration should be approximately 4 mol per cent based on the total molar amount of triazine derivative employed. Corresponding ratios and catalyst concentrations may be used with other mixtures of triazine derivatives of the kind embraced by Formula I, or the ratios and catalyst concentrations may be varied therefrom as desired or as conditions may require in order to obtain the desired reactivity of the mixed triazine derivatives toward a particular glycol or other polyhydric alcohol.

It is to be noted that 2-diethylamino-4,6-dimethoxy-1,3,5-triazine also exerts a catalytic effect on the reaction of 2-amino-4,6-diethoxy-1,3,5-triazine toward a polyethylene glycol. Since triethylene glycol is a typical polyethylene glycol, the results are believed to be general for the simultaneous transesterifications of polyethylene glycols with mixtures of two different triazine derivatives of the kind covered by Formula I, in one of which the amino group is unsubstituted and in the other of which the hydrogen atoms of the amino nitrogen have been replaced by two of the same or different monovalent hydrocarbon radicals to yield an N-disubstituted triazine derivative.

EXAMPLE 33

This example shows the stepwise transesterification of 2-(N-methyl-N-phenylamino)-4,6 - dimethoxy - 1,3,5-triazine and 2 - amino - 4,6-diethoxy-1,3,5-triazine with triethylene glycol.

A mixture of 2-(N-methyl-N-phenylamino)-4,6-dimethoxy-1,3,5-triazine and triethylene glycol (having dissolved therein 4 mol per cent of sodium based on the molar amount of triazine derivative) in the ratio of 3 mols of the former to 4 mols of the latter was heated under reduced pressure for 75 minutes at 100° to 105° C. The 2-amino-4,6-diethoxy-1,3,5-triazine was then added together with an additional 4 mol per cent of a sodium based on the molar amount of the triazine derivative. The resulting reaction mass was heated under reduced pressure for 1 hour at 120° C., whereby 98% of the theoretical amount of methanol and 68% of the theoretical amount of ethanol were obtained. After heating for an additional hour at 130° C. and for 15 minutes at 150° C. under reduced pressure, the yields of methanol and ethanol evolved were 100% and 89%, respectively, of the theoretical amounts. The resinous product was clear, light-colored, soft and tacky.

It will be understood, of course, by those skilled in the art that my invention is not limited to the specific polyhydric alcohols, triazine derivatives and catalysts named in the above illustrative examples. Thus, instead of sodium or an alcoholate of sodium as a catalyst, I may use any of the other alkali metals or alcoholates thereof. Other polyhydric alcohols in which the hydroxy groups are all primary or all secondary or some primary and some secondary may be employed, for example, glycerol, pentaerythritol, mannitol, sorbitol, dipentaerythritol, 1,3-butylene glycol, pentaethylene glycol, heptaethylene glycol, octaethylene glycol, decaethylene glycol, polyvinyl alcohols, polyallyl alcohols, 2-butyl-1,3-octanediol (2-butyl-3-pentyl-1,3-propanediol), 2-ethyl-2-methylol-1-hexanol(2-ethyl-2-butyl-1,3-propanediol), 6-methyl-2,4-heptanediol(1-methyl-3-isobutyl-1,3-propanediol), etc.

Illustrative examples of other triazine derivatives of the kind embraced by Formula I that may be used are:

2-methylamino-4,6-dialloxy-1,3,5-triazine
2-allylamino-4,6-dimethoxy-1,3,5-triazine 2-amino-4,6-diphenoxy-1,3,5-triazine
2-amino-4,6-diphenylmethoxy-1,3,5-triazine
2-benxylamino-4,6-diethoxy-1,3,5-triazine
2-anilino-4,6-dipropoxy-1,3,5-triazine
2-amino-4,6-dipropoxy-1,3,5-triazine
2-amino-4,6-diisopropoxy-1,3,5-triazine
2-anilino-4,6-dimethoxy-1,3,5-triazine
2-(N-methyl-N-cyclohexylamino)-4,6-dimethoxy-1,3,5-triazine
2-(N-ethyl-N-cyclohexylamino)-4,6-dimethoxy-1,3,5-triazine
2-dicyclohexylamino-4,6-dimethoxy-1,3,5-triazine
2-dodecylamino-4,6-dialloxy-1,3,5-triazine
2-octadecylamino-4,6-dialloxy-1,3,5-triazine
2-anilino-4,6-dialloxy-1,3,5-triazine
2-amino-4,6-dimethalloxy-1,3,5-triazine
2-(N-methyl-N-phenylamino)-4,6-dialloxy-1,3,5-triazine
2-dianilino-4,6-dipentoxy-1,3,5-triazine
2-amino-4-methoxy-6-ethoxy-1,3,5-triazine
2-methallylamino-4-alloxy-6-methalloxy-1,3,5-triazine
2-ditolylamino-4-propoxy-6-butoxy-1,3,5-triazine
2-dioctadecylamino-4,6-diphenoxy-1,3,5-triazine
2-naphthylamino-4,6-dimethoxy-1,3,5-triazine
2-dibutenylamino-4,6-dihexoxy-1,3,5-triazine
2-cyclohexenylamino-4,6-dicyclohexoxy-1,3,5-triazine
2-diethylphenylamino-4,6-dialloxy-1,3,5-triazine
2-amino-4,6-di-(phenylpropoxy)-1,3,5-triazine
2-amino-4,6-dihexenoxy-1,3,5-triazine
2-oleylamino-4,6-diethoxy-1,3,5-triazine
2-amino-4-methoxy-6-phenoxy-1,3,5-triazine Such compounds are prepared, for example, by methods such as described under some of the specific examples with reference to other compounds of the kind covered by Formula I. More detailed information on the preparation of some of these compounds also is given in the aforementioned copending application of James R. Dudley, Serial No. 700,840.

The resinous compositions of this invention may be modified in various ways, for example by effecting the reaction between the polyhydric alcohol and the triazine derivative in the presence of various modifying agents. For instance, the reaction may be effected in the presence of a monohydric alcohol having a boiling point higher than the alcohol by-product of the reaction, or in the presence of waxes or wax-like bodies or various natural or synthetic resins or gums.

Certain of the linear polymers of the present invention, more particularly those which contain at least one hydrogen atom attached to the nitrogen atom of the amino grouping of the triazine nucleus, are especially suitable for use in the preparation of thermosetting resinous compositions. For example, such polymers or polymers obtained by reacting a polyhydric alcohol with a mixture of (1) a triazine derivative having an unsubstituted or partially substituted amino grouping attached to the triazine nucleus and (2) a triazine derivative having both of its hydrogen atoms of the amino grouping replaced by a monovalent hydrocarbon radical may be reacted with an aldehyde, e. g., formaldehyde, as more fully described and claimed in my copending application Serial No. 717,605, filed concurrently herewith.

The resinous materials of this invention also may be employed as modifiers, more particularly as plasticizers, of other synthetic resins, in order to impart toughness or improved plasticity to resins which otherwise are excessively brittle or have poor plasticity. They may be co-reacted with various aldehyde-reaction products, for example partial reaction products of an aldehyde, e. g., formaldehyde, and phenol or a substituted phenol, urea or a substituted urea, melamine or other aminotriazine, etc. They also may be incorporated into alkyd resins. For instance, the reaction between the polyhydric alcohol and the triazine derivative may be effected in the presence of an excess of the former, and the unreacted polyhydric alcohol then may be esterified with phthalic anhydride, maleic anhydride, fumaric acid or other polycarboxylic acid or anhydride in the presence of the transesterification product thereby to obtain a modified alkyd resin.

Other uses of the products of the present invention include adhesive, casting, molding and coating compositions, as well as textile-treating compositions.

My new synthetic materials may be used alone or admixed with various fillers, pigments, dyes or other modifying agents, e. g., phenol-aldehyde resins, urea-aldehyde resins, melamine-aldehyde resins, alkyd resins, cellulose esters, cellulose ethers, hydrocarbon-substituted polysiloxane resins, etc. The soluble polymers may be dissolved in solvent naphtha, xylene, benzene, toluene, butanol, methyl ethyl ketone, amyl acetate, etc., to form coating and impregnating compositions of any desired viscosity. Such compositions may have incorporated therein linseed oil, tung oil, soya bean oil or acids thereof, or other drying or semi-drying oils or acids, as well as driers, more particularly metallic driers, e. g., cobalt naphthenate, manganese naphthenate, cobalt resinate, etc., to improve the adhesive and drying characteristics of the composition.

Chemical compounds represented by the general formula

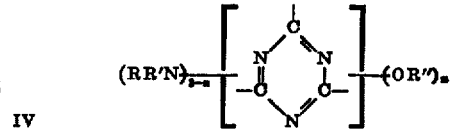

IV where $n$ represents an integer which is at least 1 and not more than 2, R represents a member of the class consisting of hydrogen and alkyl radicals containing at least 12 and not more than 18 carbon atoms, R' represents an alkyl radical containing at least 12 and not more than 18 carbon atoms, and R'' represents a radical which corresponds to the residue of a primary aliphatic monohydric alcohol are disclosed and claimed in the copending application of Dagfrid Holm-Hansen, Serial No. 717,593, filed concurrently herewith.

Chemical compounds represented by the same formula as Formula IV where $n$ represents an integer which is at least 1 and not more than 2, R represents a member of the class consisting of hydrogen, lower alkyl radicals and cyclohexyl radicals, R' represents a cyclohexyl radical and R'' represents a radical which corresponds to the residue of a primary aliphatic monohydric alcohol are disclosed and claimed in the copending application of Pierrepont Adams Serial No. 717,589, filed concurrently herewith.

What I claim as new and desire to secure by Letters Patent of the United States is:

1. A composition comprising a synthetic material obtained by effecting reaction under heat between ingredients including (1) a triazine represented by the general fromula

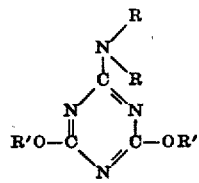

where R represents a member of the class consisting of hydrogen and monovalent hydrocarbon radicals and R' represents a monovalent hydrocarbon radical and (2) a polyhydric alcohol in which the hydroxy groups are members of the class consisting of primary and secondary hydroxy groups, the hydroxy groups being the only reactive functional groups which are present in the said polyhydric alcohol.

2. A composition as in claim 1 wherein R represents hydrogen.

3. A composition as in claim 1 wherein R' represents an alkyl radical.

4. A composition as in claim 1 wherein R represents hydrogen and R' represents an alkyl radical.

5. A composition comprising the resinous product of a transesterification reaction under heat between a 2-amino-4, 6-dialkoxy-1,3,5-triazine and a dihydric alcohol in which the hydroxy groups are primary and are the only reactive functional groups present therein.

6. A composition comprising a linear polymer obtained by effecting a transesterification reaction under heat between 2-amino-4,6-dimethoxy-1,3,5-triazine and a dihydric alcohol in which the hydroxy groups are primary and are the only reactive functional groups present therein.

7. A composition comprising a linear polymer obtained by effecting a transesterification reaction under heat between 2-amino-4,6-diethoxy-1,3,5-triazine and a dihydric alcohol in which the hydroxy groups are primary and are the only reactive functional groups present therein.

8. A linear polymer which is the product of a transesterification reaction under heat between 2-amino-4,6-dimethoxy-1,3,5-triazine and diethylene glycol.

9. A linear polymer which is the product of a transesterification reaction under heat between 2-amino-4,6-dimethoxy-1,3,5-triazine and triethylene glycol.

10. A linear polymer which is the product of a transesterification reaction under heat between 2-amino-4,6-diethoxy-1,3,5-triazine and diethylene glycol.

11. The method of preparing new synthetic compositions which comprises effecting reaction under heat between ingredients including (1) a triazine derivative represented by the general formula

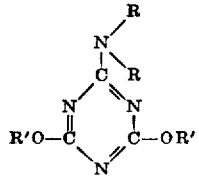

where R represents a member of the class consisting of hydrogen and monovalent hydrocarbon radicals and R' represents a monovalent hydrocarbon radical and (2) a polyhydric alcohol in which the hydroxy groups are members of the class consisting of primary and secondary hydroxy groups, the hydroxy groups being the only reactive functional groups which are present in the said polyhydric alcohol.

12. The method of preparing linear polymeric materials which comprises effecting a transesterification reaction under heat between ingredients including (1) a triazine derivative represented by the general formula

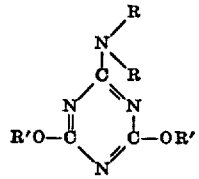

where R represents a member of the class consisting of hydrogen and monovalent hydrocarbon radicals and R' represents a monovalent hydrocarbon radical and (2) a dihydric alcohol in which the hydroxy groups are primary and are the only reactive functional groups present therein.

13. The method of preparing linear polymeric materials which comprises heating, at a temperature not exceeding about 155° C., a mixture containing (1) a triazine derivative represented by the general formula

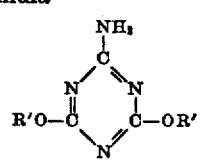

where R' represents a monovalent hydrocarbon radical, (2) a dihydric alcohol in which the hydroxy groups are primary and are the only reactive functional groups present therein, the reactants of (1) and (2) being in approximately equal molar proportions, and (3) a catalyst which is an alkali metal, and removing the volatile matter evolved during the reaction from the reaction vessel as transesterification between the reactants proceeds.

14. The method of preparing linear polymeric materials which comprises effecting a transesterification reaction by heating, under reduced pressure and at a temperature not exceeding about 155° C., a mixture containing (1) a 2-amino-4,6-dialkoxy-1,3,5-triazine, (2) a dihydric alcohol in which the hydroxy groups are primary and are the only reactive functional groups present therein, the reactants of (1) and (2) being in approximately equal molar proportions, and (3) a catalyst which is an alkali metal, the said catalyst being employed in an amount, calculated as alkali metal, corresponding to at least 1.5 mol per cent of the molar amount of the triazine derivative of (1) employed, and removing the by-product alcohol from the reaction vessel as transesterification between the reactants proceeds.

15. The method of preparing linear polymeric materials which comprises effecting a transesterification reaction by heating, under reduced pressure and at a temperature not exceeding about 155° C., a mixture of (1) a 2-amino-4,6-dialkoxy-1,3,5-triazine, (2) a dihydric alcohol in which the hydroxy groups are primary and are the only reactive functional groups present therein, the reactants of (1) and (2) being in approximately equal molar proportions, and (3) a sodium alcoholate in an amount, calculated as sodium, corresponding to from about 2 to about 10 mol per cent of the molar amount of the triazine derivative of (1) employed, and distilling the by-product alcohol under reduced pressure from the reaction vessel as transesterification between the reactants proceeds.

16. A method as in claim 13 wherein the catalyst of (3) is an alcoholate of an alkali metal.

17. A method as in claim 14 wherein the catalyst of (3) is an alcoholate of an alkali metal.

FREDERIC C. SCHAEFER.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,211,710 | Zerweck | Aug. 13, 1940 |
| 2,275,467 | Pollack | Mar. 10, 1942 |
| 2,296,823 | Pollack | Sept. 2?, 1942 |
| 2,381,121 | Ericks | Aug. 7, 1945 |